United States Patent [19]
Brabazon

[11] 4,275,860
[45] Jun. 30, 1981

[54] FULL SPAN SHIPBOARD FUELING SYSTEM FOR AIRCRAFT

[76] Inventor: Jack A. Brabazon, 925 Mooney Ave., Ottawa, Ontario, Canada, K2A 3A2

[21] Appl. No.: 947,722

[22] Filed: Oct. 2, 1978

Related U.S. Application Data

[63] Continuation of Ser. No. 812,607, Jul. 5, 1977, abandoned.

[51] Int. Cl.³ ............... B64D 37/14; B64D 37/18; B64F 1/28
[52] U.S. Cl. ............... 244/135 R; 114/261; 169/62; 210/195.1; 137/234.6; 137/239; 137/560; 137/561 R; 222/318; 222/148; 222/189; 141/91
[58] Field of Search ............ 114/270, 261, 262, 211, 114/72, 74 R, 74 A; 244/135 R, 135 A; 169/5, 7, 11, 62; 210/194, 195 R, 195.1; 137/290, 236 R; 222/318, 152; 141/47–49, 91

[56] References Cited

U.S. PATENT DOCUMENTS

| | | | |
|---|---|---|---|
| 1,779,786 | 10/1930 | Unzue | 114/74 A |
| 2,160,831 | 6/1939 | Colby et al. | 114/211 X |
| 2,282,997 | 5/1942 | Edmundson | 114/270 |
| 2,404,418 | 7/1946 | Walker | 114/74 A |
| 2,944,670 | 7/1960 | Hutcheson | 210/194 X |
| 3,331,404 | 7/1967 | Gehring et al. | 141/91 |

FOREIGN PATENT DOCUMENTS 678259  8/1952  United Kingdom ............... 114/74 R Primary Examiner—Galen L. Barefoot
Attorney, Agent, or Firm—Michael M. Sakovich

[57] ABSTRACT

A shipboard system that provides safe storage and complete quality control of aviation fuels from acceptance of the fuel at shipside to delivery of clean, dry fuel at a shipborne aircraft includes a storage tank disposed in a closed chamber defined by a cofferdam. The tank is mounted in the chamber to provide an airspace around all sides which is vented to the atmosphere and maintains any concentration of fuel vapor in the chamber below a predetermined lean limit. Fire protection apparatus of the system is actuated by a rate of temperature rise detector and releases an agent that floods the chamber to terminate the combustion cycle in the event of a fire. Conduit runs include filters to remove contaminants when fuel is pumped through and also include a closed-circuit filtered conduit through which the fuel is frequently recirculated to control deterioration of the system and degradation of the fuel caused by long term storage and intermittent use of the system. The conduits lead downwardly to the tank from intake and discharge locations to provide a gravity drain and further include a purging system that clears selected conduits with a metered portion of inert gas to remove residual fuel and vapors after each conduit is used.

11 Claims, 5 Drawing Figures

FULL SPAN SHIPBOARD FUELING SYSTEM FOR AIRCRAFT

This is a continuation of application Ser. No. 812,607, filed July 5, 1977, now abandoned.

BACKGROUND OF THE INVENTION

This invention relates to fuel storage and handling systems and more particularly to such systems fo shipboard installations.

Aircraft fueling system facilities aboard ship have, in the past, been generally designed and installed in accordance with outmoded ship-oriented techniques that gave insufficient regard to the intended objectives of the system. Thus, it was frequently the case that materials used in the construction of the system were not suited for handling aviation fuels. In this respect, it is noted that elemental copper or alloys bearing copper produce degradation of aircraft fuels. Moreover, in the case of smaller ships carrying only a reconnaissance aircraft such as a helicopter, it was common to find makeshift fuel systems in which maintenance and "good housekeeping" were virtually impossible, and fire and explosion hazard protection was practically non-existent.

A known fuel storage and handling system used aboard ship which is considered to be a "safte system" is the water flotation system wherein water is pumped into a fuel tank to displace the fuel upwardly through a conduit system to a dispensing location. The fuel tank is enclosed by a cofferdam which is normally flooded with water to provide fire protection.

A number of problems occur with the water flotation system, mainly as a result of water contact with the fuel. The water becomes a principal contaminant and often generates ancillary problems by inducing corrosion in the fuel system. Moreover, corrosion problems occur in fittings disposed in the space between the tank and cofferdam as a result of exposure to the water.

Some effort has been expended in avoiding the difficulties with the water flotation system by employing shore-based, standard commercial type fuel systems aboard ship. The problems of corrosion and contamination are substantially overcome since dry storage tanks for aviation fuel or normally fitted, and electric pumps with filter and water separators are used for conducting the fuel through a conduit system to predetermined locations. The main drawback to such systems is the fire hazard that they represent since shore-based installations do not meet safety requirements for shipboard use.

Although fuel delivered to storage may be clean and relatively free of water, the humidity of a shipboard environment will result in some water being absorbed and dissolved in the fuel. Thus, where a ship takes on fuel during a hot, humid day and thereafter moves to a lower temperature environment, water will come out of solution as a result of reduced solubility in the colder fuel. The free water will settle in the tank, causing corrosion and producing solid impurities such as rust particles which will contaminate the fuel unless the tank is constructed of corrosion resistant materials.

The presence of contaminants in an aircraft fuel system product increased fuel pump wear and eventual fuel control unit damage. Moreover, a serious problem that is commonly experienced due to the presence of water is fuel interruption caused by ice formation in the aircraft fuel system. It is apparent that an end result of improper fuel storage employing the known systems of the prior art, aside from the fire hazard presented to the mother ship, is the probable loss at sea of an aircraft and its crew through either engine or fuel system failure. At the very least, continued operation of an aircraft with contaminated fuel will result in increased equipment maintenance and shorter engine life.

SUMMARY OF THE INVENTION

A principal objective of the present invention is to provide complete shipboard quality control of aviation fuels from acceptance of the fuel at shipside and storage aboard ship to safe delivery of clean, dry fuel at a shipborne aircraft.

A fullspan shipboard fueling system for aircraft that achieves the foregoing objective includes inerting systems and hazard protection, and is designed to include all of the established requirements.

The system is particularly adapted to provide complete quality control of the fuels from acceptance of the fuel at shipside and through the system to a helicopter on the flight deck to assure that only clean dry fuel will be delivered.

A shipboard fuel storage and handling system of the present invention is constructed of materials resistant to fuel and water and inert to the fuels so that fuel degradation in storage does not occur.

The fuel storage system is also provided with a dry cofferdam structure arrangement that minimizes that contamination of fuel through contact with water and substantially reduces the corrosion of fuel line and storage tank fittings within the chamber of the cofferdam.

The system of the invention has been designed for installation as a ship-oriented system, to meet all design requirements for shipboard use, including adequate fire protection, and to achieve its objective of safely storing and dispensing substantially dry, clean fuel for aircraft consumption.

The problem experienced with known fuel storage and handling systems in shipboard applications may be substantially overcome and the provisions of the invention achieved by recourse to the invention which is a fullspan shipboard fueling system for aircraft that comprises fuel storage means including a tank for selectively holding low and high flash point fuels aboard a ship. The system further comprises cofferdam means enclosing the fuel storage means in a substantially dry, closed chamber. Means for supporting the tank in spaced relation with the walls of the chamber provide a continuous airspace between all exterior sides of the tank and the walls. An air intake vent and an exhaust vent each communicate the airspace with the atmosphere. A blower disposed within the exhaust vent continuously draws in fresh air though the air intake vent to the airspace and withdraws residual fuel vapours and air therefrom to maintain a concentration of any fuel vapours in the chamber below a predetermined lean limit. Means are provided which communicate with the tank for conducting the fuel to designated locations. Further means communicating with the tank selectively recirculate and condition the fuel in minimize its degradation from contaminants entrained therein.

DESCRIPTION OF THE DRAWINGS

The invention will now be more particularly described with reference to embodiments thereof shown by way of example, in the accompanying drawings wherein.

DESCRIPTION OF THE ILLUSTRATED EMBODIMENTS

Figure 1:
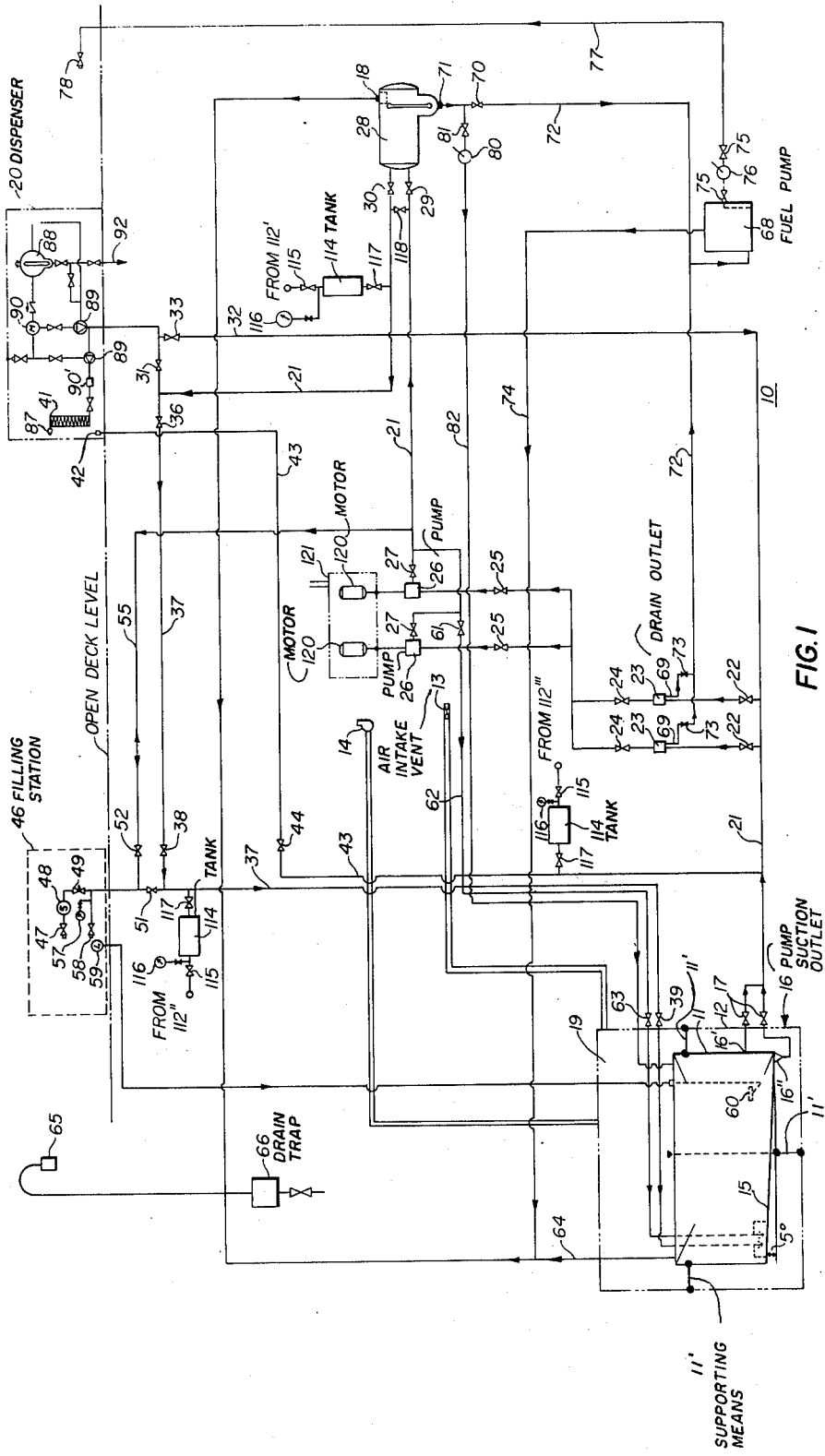
FIG. 1 is a schematic diagram of a shipboard fuel storage and handling system in accordance with the present invention.

Referring now to the drawings, FIG. 1 illustrates a schematic diagram of a helicopter fueling system 10 which is capable of handling either high or low flash type aviation fuels and is adapted to be installed aboard a ship. An aviation fuel tank 11 is shown enclosed within a chamber 19 defined by the walls of a cofferdam 12. It will be observed from FIGS. 1 and 2 that the tank 11 is supported within the chamber 19 in a manner which provides a continuous air space between all exterior sides of the tank 11 and the walls of the cofferdam 12. Although the means for supporting the tank 11 are not detailed in the figures, any suitable means in accordance with good shipbuilding practice may be used to provide fuel storage means of acceptable construction. The walls of the tank 11 are fabricated of type 316L stainless steel. And, any structurals and stiffeners securing the tank 11 to the cofferdam 12 are located on the outside of the tank 11 in the chamber 19 as indicated generally at 11'.

In view of the fact that aviation fuels are to be carried on board, and because of the sea environment, all material, with the exception of hoses, in contact with the fuel is stainless steel such as type 316L. It should be understood that other materials may be used provided such materials are in accord with the stated objectives of the invention.

The cofferdam 12 is provided with a venting system comprising a fresh air intake vent 13 and an exhaust vent having a blower 14. The purpose of the venting system is to withdraw fuel vapour from any fuel leaking into the cofferdam at a rate which is sufficient to maintain a concentration of fuel vapour in the chamber 19 below a predetermined limit.

The flammability range of fuels under confined space conditions is usually characterized by two fuel-air concentrations, the "lean limit" at which there is insufficient fuel to enable flame propagation and the "rich limit" where there is an excess of fuel to support combustion. In the present invention, it will be understood that the vent 13 and blower 14 are selected to have sufficient capacity to maintain the concentration of any fuel vapour in the chamber 19 below the lean limit, which is to say that there will be insufficient fuel to sustain flame propagation.

Figure 2:
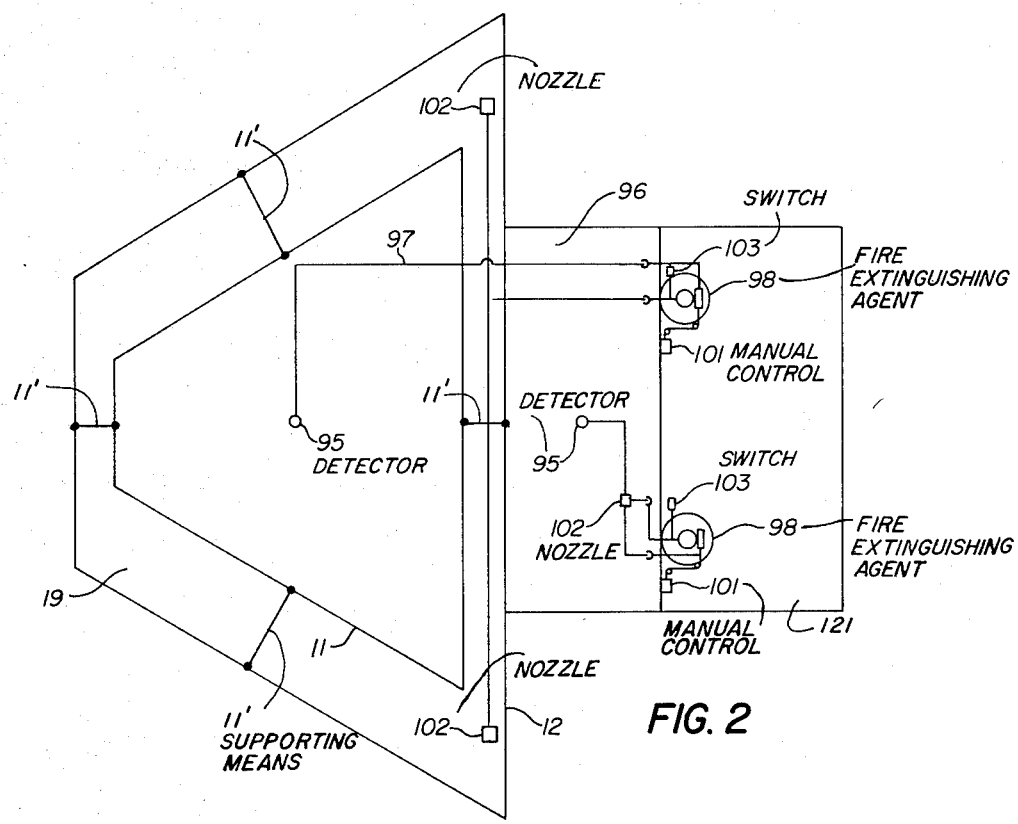
FIG. 2 is a plan view of a fuel tank and cofferdam and a fire protection system therefor in accordance with the invention.

FIG. 2 shows that both the tank 11 and cofferdam 12 are trapezoidal in a plan view in order to fit a corresponding hull section aboard ship. Moreover, FIG. 1 illustrates that the tank 11 has a bottom 15 which is sloped at an angle of about 5° to the horizontal down to a pump suction outlet 16. In conformance with good construction standards, the bottom 15 is devoid of waves and dents so that water or dirt cannot collect in pockets formed thereby. It will be further noted that the outlet 16 includes two suction outlets that lead to fuel supply pumps. A first outlet 16' is located 15 inches above the mean height of the bottom 15, and a second outlet 16" is located at a level below the lowest point of the tank 11.

The system 10 of FIG. 1 includes fuel storage means defined by the tank 11 and cofferdam 12 together with conduit means which communicate the tank 11 to various designated locations. A principal location is a fueling and defueling dispenser 20 which is located in an open deck area that is convenient to a helicopter takeoff and landing pad (not shown). Fuel for the dispenser 20 is conducted from the outlet 16 via a filling line portion of a conduit system which includes a plurality of remotely controllable globe valves that permit opening and closing various portions of the conduit system. The filling line from the outlet 16 comprises a conduit 21 which is coupled to the outlet 16 via a pair of valves 17 from which fuel is conducted to a pair of valves 22. The conduit 21 branches at this point and continues as two separate lines, each line passing through a strainer 23 to filter out solids from the fuel. The outlet side of each strainer 23 is coupled through a separate valve 24. The outlet sides of both valves 24 are joined and form a continuation of the single conduit 21 to another pair of valves 25 where the conduit again branches, each branch feeding an inlet to first and second fuel suction pumps 26. The outlet side of each pump 26 is conducted through a valve 27, and the outlets of both valves 27 are joined and continue as the single conduit 21 through a filter water separator 28 to the dispenser 20. It will be noted that a valve 29 is located at an inlet to the separator 28 and that a valve 30 is disposed at the outlet of the separator. The separator 28 is also provided with an automatic air release port 18 that is vented to the atmosphere. The conduit 21 continues from the valve 30 and is connected to the dispenser 20 through a valve 31.

A conduit 32 is shown coupled to the dispenser 20 through a valve 33 and is used in defueling operations. A lowermost end of the conduit 32 is connected to the inlet sides of the valves 22 to obtain suction pressure from the pumps 26. In the course of a defueling operation, where fuel is withdrawn from the tanks of an aircraft via the dispenser 20, the valve 31 is closed and the fuel is conducted along the conduit 21 to the junction of the valves 31 and 36. The valve 36 is opened and the withdrawn fuel continues along a conduit 37 and through valves 38 and 39 to a first inlet of the tank 11, having been previously strained and filtered by the strainers 23 and the separator 28, respectively.

Under normal conditions, where fuel storage time is not excessive, the fuel may be taken directly from the tank 11 to the dispenser 20 as described. However, in the event that the fuel is stored for a lengthy interval, periodic conditioning of the fuel is recommended to minimize degradation from contaminants. Two fuel recirculation systems are provided which permit conditioning the fuel by conducting it through the strainers 23, and the separator 28. Fuel conditioning is at the discretion of an operator and is performed as required for existing conditions without going to a continuous overfiltering process that is more costly to operate.

The aforenoted fuel recirculation systems are shown in FIG. 1 and include a shared conduit line together with two separate lines which are used to selectively condition the fuel in the filling line and in the tank 11. The shared conduit line comprises the previously described filling line conduit 21. Thus, fuel fed to the dispenser 20 is conducted through a hose 41 having a discharge or nozzle end that is connectable to a hose coupler 42 and a free end that is disposed at least as low as a lowermost coil of the hose. Suction pressure is applied to the coupler 42 via a conduit 43 and a serially connected valve 44 having its inlet side connected to the inlet side of the valves 22. Fuel circulating through the conduits 21 and 43, the hose 41, strainers 23 and separator 28 is thus maintained in a clean state, free from hose talc and other contaminating media in this part of the system 10. Bulk fuel contained in the tank 11 is conditioned in a similar manner except that the conduit 37 is used to return the fuel to the tank as shown in FIG. 1.

A filling station 46 is located on deck and is fitted with a lock type coupling (not shown), which is connected to a valve 47 through which fuel is conducted to a sight flow indicator 48, a relief valve 49 set at 12 p.s.i., and therefrom to a junction of a pair of valves 51 and 52. One leg of the conduit 37 connects the outlet side of the valve 51 through the valve 39 to the first inlet of the tank 11. In this way, fuel may be directly pumped into the tank 11.

On the outlet side of the valve 49 there is connected a pressure gauge 57 and a back-to-shore connector 58 for conducting fuel overflow to a shore based fuel supply. Also located within the confines of the station 46 there will be seen a fuel level indicator 59 that is coupled to a sensor element 60 disposed within the tank 11.

In the event that the tank 11 is to be pumped out to the shore based fuel supply, the outlets of both pumps 26 are coupled through a conduit 55 and the valve 52 to the connector 58. The tank 11 may thus be emptied without conducting the fuel through the separator 28.

The pumps 26 have their outlets connected in parallel to one leg of the conduit 21 leading to the inlet of the separator 28. At this point, there is also connected a relief valve 61 which feeds back to a second inlet of the tank 11 through a conduit 62 and a valve 63. In the event of a restriction in a fuel passage at a point downstream of the pumps, the valve 61 will open and permit the fuel to return to the tank 11 without producing an excessive buildup of fuel pressure and concomitant fuel leakage.

During any of the aforedescribed fuel-handling operations, a back pressure within the tank 11 is prevented by a venting system that includes a vent conduit 64 having a free end 65 which is secured to a mast of the ship and which is vented to the atmosphere. A moisture drain trap 66 is located below the mast and traps out any condensate to prevent its entry to the tank 11. The trap 66 is located above deck in the dispenser 20 which is heated to prevent the condensate from freezing.

A fuel sump 68 is provided in the system 10 and is adapted to receive drain outlets 69 from the strainers 23 together with a drain outlet 71 from the separator 28. A conduit 72 is shown leading from each drain outlet to the sump 68. It will be noted that the inlets of the conduit 72 may be shut off from any drain outlet by means of drain valves 70 and 73, and that the sump 68 is provided with a vent conduit 74 that communicates with the conduit 64 to prevent backpressure buildup. An outlet of the sump 68 is provided with a pair of valves 75 between which is serially connected a hand pump 76. The outlet side of one valve 75 is shown connected to a conduit 77 which leads to a connector 78 located on the open deck. The contents of the sump 68 may be thus pumped out for disposal by opening both valves 75 and operating the pump 76 to discharge the contents through the connector 78 to a container on deck or to a shore station.

A second hand pump 80 is shown serially connected through a valve 81 from the outlet 71 through a conduit 82 to a third inlet in the tank 11. Drain down of the separator 28 and the system upstream of the separator 28 may thus be manually assisted by using the pump 80.

Figure 5:
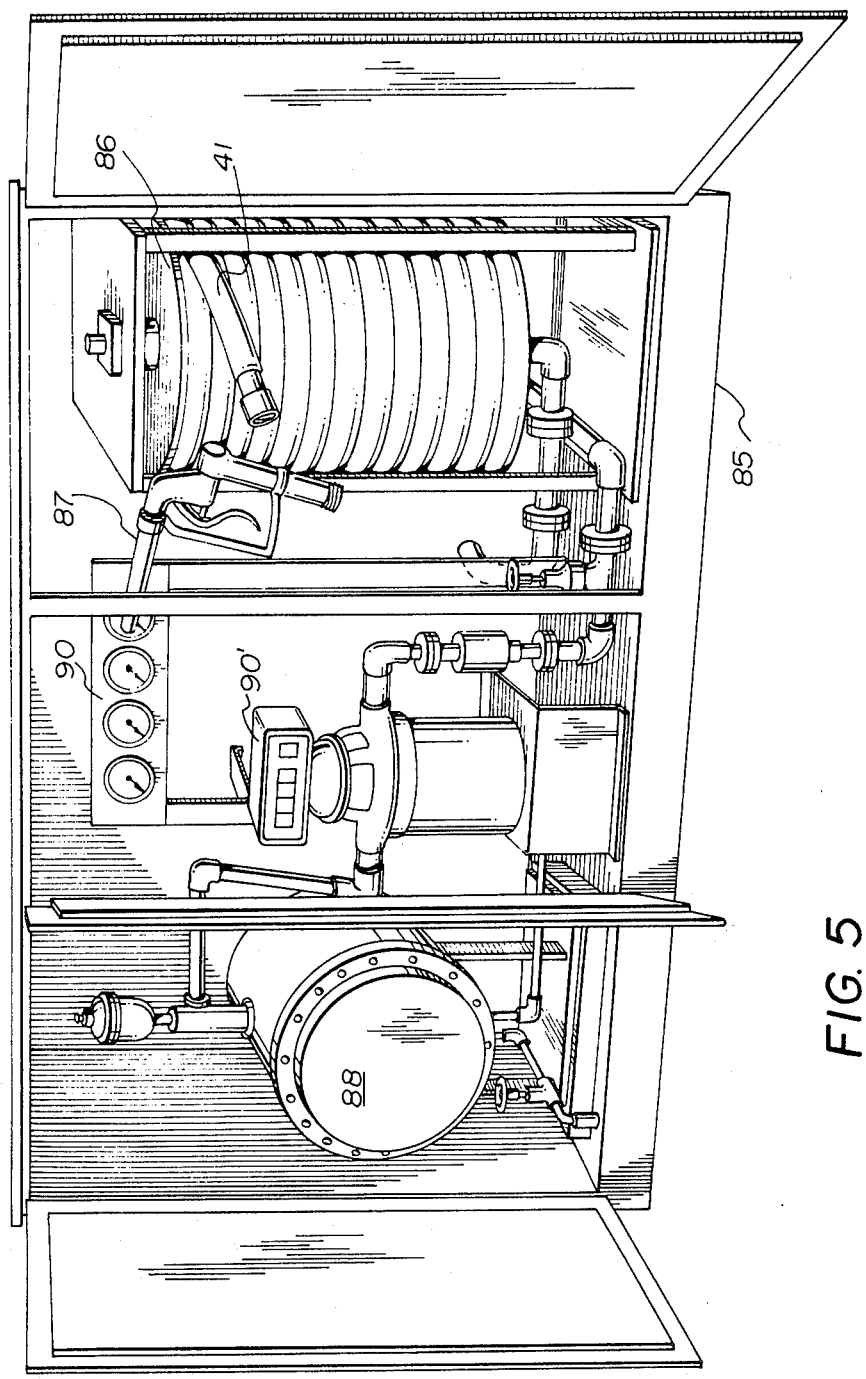
FIG. 5 is a front elevation view of the dispenser in FIG. 3 shown in perspective.

The dispenser 20 includes a weather-tight and thermostatically insulated cabinet 85 which may be seen in FIG. 5. Referring both to FIGS. 1 and 5, it will be noted that the hose 41 is entrained about a vertically mounted reel 86 within the cabinet 85, the reel being operable by an air driven motor (not shown) in order to reduce the risk of fire. This arrangement of the hose and reel facilitates drain down of the system by avoiding retention of fuel in the hose as would occur if the hose and reel were horizontally disposed. The system 10 also provides means to prevent static discharges at the hose. Thus, a fueling nozzle 87 is connected by means of a ground wire assembly through an electrical cable entrained about the reel 86 with the hose 41 to an electrically neutral ground for further fire protection. Since the remaining components of the system are metallic, there is provided continuous electrical bonding of all the components.

FIG. 1 illustrates that the dispenser 20 is also provided with a filter, water separator 88, a quick-action three-way valve 89 for initiating a fueling or defueling mode of operation, a bank of meters 90 for monitoring fuel pressure during fueling operations and suction or vacuum pressure during defueling operations, a totalizer 90, and an arrangement of valves, the purpose of which is evident from the figure. It will be observed in FIG. 1 that drain means are provided in a form of a conduit 92 leading to the sump 68 in a manner similar to that of the separator 28. While not indicated in the drawings, it will be understood that a defueling spout is connected to the nozzle 87 during defueling operations. Additionally, an adjustable vacuum breaker (not shown), is provided immediately upstream of the hose connection to limit buildup of vacuum on completion of defueling in order to protect the fuel tanks of an aircraft.

FIG. 2 is a plan view of the tank 11 and cofferdam 12 showing the physical relation of each with regard to a pump room 96. There is also shown a layout of a fireproofing system that releasably discharges an extinguishing agent into the chamber 19 or into the pump room 96 from separate sources of supply in response to actuation by a rate of temperature rise detector 95. It will be understood that the detector 95 is centrally located in the ceiling of the cofferdam 12 and within the chamber 19. The detector 95 is a non-electrical device in view of the hazards in using electrically operated apparatus in a potentially explosive atmosphere. In the illustrated embodiment, the detector 95 is a pneumatic heat actuating device which is connected by means of tubing 97 to a control portion of a source 98 containing the extinguishing agent. A manual control 101 mounted on an outside wall is provided to actuate the source 98 in the event of early fire detecting by a crew member. It will be observed too that the source 98 is provided with an outlet that is connected to a pair of nozzles 102 which flood the chamber 19 with the extinguishing agent. In order to maximize the effectiveness of the extinguishing agent, a pressure operated switch 103 is provided to deenergize the blower 14. Concurrently, an alarm circuit (not shown) is energized at a control center of the ship.

The pump room 96 is used as a central location for all pumping equipment, inlcuding the separator 28 and the sump 68. All valves or cocks which require manual operation during filling, discharging, fueling, defueling and fuel circulation operations are adapted to be locally operable within the room 96 and remotely, using mechanical means known in the art, on the open deck. Exceptions are the valves and cocks used in the dispenser 20 and the filling station 46.

In view of the nature of the apparatus items used in the room 96, it is probable that some fuel leakage will eventually occur. The risk of fire is minimized in this event by constructing the walls of the room 96 of steel and making the structure completely gastight. In addition, it will be understood that the room 96 is well vented in the manner of the cofferdam 12.

All electrical controls and switches required in the operation of the apparatus in the room 96 are preferably located outside, such as at the dispenser 20 and the filling station 46. Regarding the pumps 26, electric drive motors 120 are located adjacent the room 96, but outside in a location shown generally as an engineer's store 121. A drive shaft of each motor 120 leads through a bulkhead separating the room 96 and the store 121. The gastight integrity of the room 96 is, however, maintained by means of a gastight gland (not shown) fitted in the bulkhead to receive the shaft of each motor 120.

The source 98 comprises a cylinder of Halon FE1301 gas, stored under pressure in a liquid phase. This gas is a halogenated fire extinguishing agent comprisinng bromotrifluoromethane and is commercially referred to as Halon 1301. Since the capacity of the source 98 is usually measured in terms of weight, it will vary depending on the volume of a space to be fireproofed. This information is available in the literature of the art to permit ascertaining an adequate capacity for most applications. An illustrative example is a tank capacity of 138 pounds of Halon FE1301 for fireproofing the chamber 19.

While various extinguishing agents may be used, the common one being $CO_2$, Halon FE1301 is particularly attractive for use in total flooding extinguishing systems. A high degree of extinguishing effectiveness and lower toxicity combine to provide an inert atmosphere for many fuels, while at the same time presenting a low risk from the standpoint of personnel exposure. In addition, vision obscuration and chilling of the atmosphere are minimal in most applications. Halon operates to break the chain reaction of the combustion process with relatively small quantities of extinguishing agent. Furthermore, the high dielectric strength of the agent and lack of particulate residue enhance its use in electrical or electronic equipment. In particular, the low volume discharge is attractive where over pressurization of an enclosure may be of some concern.

A total flooding extinguishing system as is used in the present invention is based on the release of a predetermined amount of agent into an enclosure to develop a uniform extinguishing concentration throughout. The amount of agent required is based upon the size of the enclosure as previously discussed and the concentration required to extinguish or inert the particular fuel or combustible substance involved. Various factors thus determined the quantities of agent required such as whether the fuel is a flammable liquid or gas (Class B), or whether it is likely to become deep-seated (Class A).

For the embodiment of the invention disclosed herein, one pound of Halon gas discharged per fifty cubic feet of enclosed volume will produce a five percent concentration. This concentration in air provides flame extinguishment of most common fuels with a substantial factor of safety, and further provides a significant degree of effectiveness on Class A fires.

Figure 3:
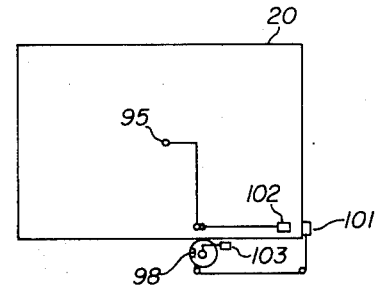
FIG. 3 is a plan view of a fueling and defueling dispenser and a fire protection system therefore.

Similar fire prevention systems are used for protecting the pump room 96 and the dispenser 20. Reference to FIGS. 2 and 3 shows a general layout for each respective system which is similar to that described for the cofferdam 12. Minor differences in each fireproofing system do occur but only as a result of physical variations in the space to be protected which necessitate various locations for the detectors 95 and nozzles 102 as well as the controls that directly affect the source 98. In accordance with the preceding discussion concerning the variable quantity of agent that is required, it is noted that the system of the present invention employs a forty pound cylinder of Halon to protect the room 96 but only a thirty pound cylinder to adequately protect the dispenser 20.

Provision has been made in the invention to purge portions of the system of conduits with dry nitrogen gas to remove any residual fuel and vapours therefrom after that part of the system has been in operation. A suitable nitrogen purge system is fitted to purge the fuel delivering conduit line, the fuel filling line, and the fuel circulating lines. The various conduits involved in each of these lines may be seen by reference to FIG. 1 and the preceding description.

Figure 4:
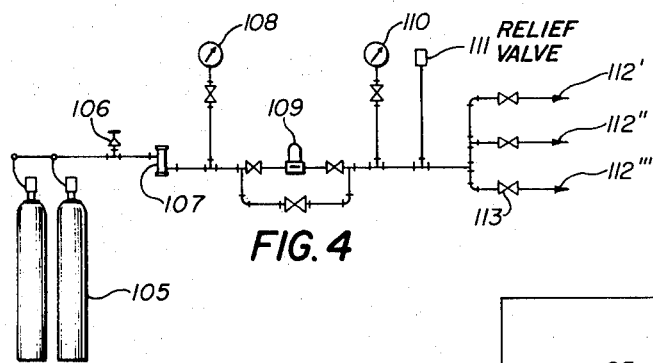
FIG. 4 is a schematic diagram of a gas purge system that is connectable to the system illustrated in FIG. 1.

The overall purge system of the invention is shown in FIGS. 1 and 4 and comprises nine 2300 p.s.i. nitrogen cylinders 105, a high pressure safety relief valve 106, a strainer 107, a high pressure gauge 108, a pressure reducer 109 having a normal metering needle valve bypass, a low pressure gauge 110 and a safety relief valve 111 to protect the low pressure side of the system. The low pressure side includes three purge lines 112, each of which feed through a separate globe valve 113 to a purge metering tank 114 as shown in FIG. 1.

Each tank 114 is provided with an inlet shut off valve 115, a pressure gauge 116 to monitor the nitrogen gas pressure at the inlet side of the tank, and a shut off valve 117 serially connected with the outlet of each tank. The respective conduits to which each tank is connected may be seen in FIG. 1. Thus, a line 112' purges the fuel delivering conduit 21, a line 112" purges the fuel filling conduit 37, and a line 112''' purges the fuel circulating conduit 43. It will be observed that a purge bypass valve 118 shunts the separator 28 to prevent damaging the filter elements during a purging operation.

The purge system takes its supply of nitrogen gas from the cylinders 105 at high pressure, reduces the gas to a lower pressure of 15 p.s.i. by means of the reducer 109 and using the metering tanks 114, which are of predetermined capacity, selectively purges the system 10 under the control of an operator.

It was previously stated that the system 10 is capable of handling aviation fuels having either high or low flash points. This is an important feature of the invention, serving to protect the ship and its crew. For example, it is not uncommon in applications to which the system 10 is put for a ship expecting high flash point fuel to erroneously receive a low flash point fuel. Unless the system is capable of handling such an occurrence, an unfortunate consequence may be an explosion and fire followed by an unexplained loss at sea of the ship and it entire crew.

It will be apparent to those skilled in the art that the preceding description of an embodiment of the invention may be substantially varied to meet particular specialized requirements without departing from the true spirit and scope of the invention disclosed. The foregoing embodiment is therefore not to be taken as indicative of the limits of the invention but rather as an exemplary structure of the invention which is defined by the claims appended hereto.

What I claim is:

1. A full span shipboard fueling system for aircraft comprising:
   fuel storage means including a tank for selectively storing low and high flash point fuels;
   cofferdam means enclosing said fuel storage means in a substantially dry, closed chamber;
   means for supporting the tank in spaced relation with the walls of the chamber to provide a continuous airspace between all exterior sides of the tank and said walls;
   an air intake vent communicating the airspace with the atmosphere;
   an exhaust vent communicating the airspace with the atmosphere;
   a blower disposed within the exhaust vent for continuously drawing in fresh air through the air intake vent to the airspace and withdrawing residual fuel vapours and air therefrom to maintain a concentration of any fuel vapours in the chamber below a predetermined lean limit;
   a plurality of conduits for conducting the fuel to designated locations;
   pump means communicating with selected ones of the conduits for controllably propelling the fuel therethrough to said locations;
   filter means in serial communication with predetermined ones of said conduits for removing predetermined contaminants in the fuel when said fuel is conducted therethrough;
   a unitary combined fueling and defueling dispenser at a designated location communicating with predetermined ones of said conduits for selectively fueling and defueling an aircraft;
   means communicating with at least one of, the tank and said dispenser for selectively recirculating and conditioning the fuel to minimize fuel degradation from contaminants entrained therein;
   means for venting said tank to the atmosphere;
   a first valve disposed in a fuel delivery conduit below the dispenser and operable to shut-off fuel flow to said dispenser; and
   means coupled to the fuel delivery conduit below said first valve for purging the conduit of fuel with a metered quantity of inert gas after the fuel flow is shut off.

2. A system as claimed in claim 1 further comprising:
   fire prevention means communicating with the airspace between the tank and cofferdam means; and
   means for detecting a fire hazard condition in said airspace and actuating the fire prevention means in response thereto.

3. A system as claimed in claim 2 wherein said means for detecting the fire hazard condition comprises a rate of temperature rise detector disposed within the chamber, said detector being adapted to actuate the fire prevention means when the temperature rise exceeds a predetermined rate.

4. A system as claimed in claim 3 wherein the fire prevention means includes a releasable agent for extinguishing a fire by chemically terminating the combustion cycle.

5. A system as claimed in claim 4 wherein said agent is effective in conditions of air movement and disturbance as exist in the vented airspace of said chamber.

6. A system as claimed in claim 1 wherein the fueling and defueling dispenser comprises:
   a fuel hose entrained about a vertically positioned rotatable drum, the hose having an uppermost end adapted to controllably discharge or receive fuel and a free end disposed at least as low as a lowermost coil of the hose; and
   a combined filter and water separator serially communicating with the free end and selected ones of the conduits, said hose and combined filter and water separator being disposed above the tank to permit substantially complete fuel drainage to the tank when the pump means is inoperative.

7. A system as claimed in claim 6 wherein the means for selectively recirculating and conditioning the fuel comprises:
   a return conduit leading from the dispenser to the inlet side of the pump means, said return conduit terminating in a coupler at the dispenser end adapted to connect to the uppermost end of the hose of complete a closed circuit with said pump means and fuel delivery conduit for recirculating the fuel through the filter and water separator;
   a second valve disposed in the return conduit below said coupler and operable to shut off fuel flow from the hose; and
   means coupled to the return conduit below the second valve for purging the return conduit of fuel with a metered quantity of inert gas when the fuel flow is shut off.

8. A system as claimed in claim 7 further comprising:
   a fill and discharge conduit leading from a filling station to said storage means for filling the tank with fuel;
   a third valve disposed in the fill and discharge conduit below the filling station and operable to shut off fuel flow from said station; and
   means coupled to the fill and discharge conduit below the third valve for purging said fill and discharge conduit of fuel with a metered quantity of inert gas when the fuel flow is shut off.

9. A system as claimed in claim 8 further including continuous electrical bonding of all components therein.

10. A system as claimed in claim 9 wherein the components of the system in contact with the fuel are constructed of materials resistant to fuel and water and substantially inert to said fuel to avoid fuel degradation during storage.

11. A system as claimed in claim 10 wherein the system components excluding the hose are fabricated from type 316L stainless steel.

* * * * *